(12) United States Patent
Bauer et al.

(10) Patent No.: US 7,575,384 B2
(45) Date of Patent: Aug. 18, 2009

(54) FLUID APPLICATOR WITH A PULL TAB ACTIVATED POUCH

(75) Inventors: Walter G. Bauer, Neenah, WI (US);
Cecelia M. Berger Sharp, Roswell, GA (US); Tamara L. Mace, Marietta, GA (US); Thomas D. Ehlert, Neenah, WI (US); Patrick S. McNichols, Hortonville, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 689 days.

(21) Appl. No.: 11/217,079

(22) Filed: Aug. 31, 2005

(65) Prior Publication Data
US 2007/0048063 A1 Mar. 1, 2007

(51) Int. Cl.
A46B 5/04 (2006.01)
(52) U.S. Cl. .......................................................... 401/7
(58) Field of Classification Search .................. 401/6, 401/7; 604/292, 306; 15/227
See application file for complete search history.

(56) References Cited

U.S. PATENT DOCUMENTS

| | | | |
|---|---|---|---|
| 506,982 A * | 10/1893 | Diamond | 222/541.1 |
| 2,044,428 A * | 6/1936 | Gilmer | 401/8 |
| 2,980,940 A | 4/1961 | Crowe | |
| 3,299,464 A | 1/1967 | O'Brien et al. | |
| 3,338,992 A | 8/1967 | Kinney | |
| 3,341,394 A | 9/1967 | Kinney | |
| 3,386,793 A | 6/1968 | Stanton | |
| 3,462,070 A * | 8/1969 | Corella | 206/219 |
| 3,481,676 A | 12/1969 | Schwartzman | |
| 3,485,562 A | 12/1969 | Hidden et al. | |
| 3,494,821 A | 2/1970 | Evans | |
| 3,502,538 A | 3/1970 | Petersen | |
| 3,502,763 A | 3/1970 | Hartmann | |
| 3,542,615 A | 11/1970 | Dobo et al. | |

(Continued)

FOREIGN PATENT DOCUMENTS

DE 3335614 4/1985

(Continued)

OTHER PUBLICATIONS

PCT Search Report—Nov. 3, 2006.

(Continued)

*Primary Examiner*—Huyen Le
(74) *Attorney, Agent, or Firm*—Dority & Manning, P.A.

(57) ABSTRACT

A fluid applicator device includes a wipe layer, and a back layer attached to the wipe layer to form an interior space therebetween. A pouch is positioned within the interior space, and a fluid composition is contained within a cavity defined in the pouch. Exit structure is defined in the pouch through which the composition exits the cavity. A flap is defined by an extension of the pouch material and is folded over onto the pouch so as to releasably seal over the exit structure. The flap has an extension that extends out from between the wipe layer and back layer a sufficient distance so as to be grasped by a user. When the flap extension is pulled by the user, the flap is caused to unfold and unseal the exit structure. The fluid composition is the pressed out of the pouch with use of the applicator.

28 Claims, 8 Drawing Sheets

U.S. PATENT DOCUMENTS

| | | | |
|---|---|---|---|
| 3,640,877 A | 2/1972 | Gobert | |
| 3,692,618 A | 9/1972 | Dorschner et al. | |
| 3,722,174 A | 3/1973 | Bergevin et al. | |
| 3,768,916 A | 10/1973 | Avery | |
| 3,802,817 A | 4/1974 | Matsuki et al. | |
| 3,849,241 A | 11/1974 | Butin et al. | |
| 3,855,046 A | 12/1974 | Hansen et al. | |
| 3,998,559 A | 12/1976 | Hoyt | |
| 4,027,985 A | 6/1977 | Loesser, III | |
| 4,084,910 A | 4/1978 | LaRosa | |
| 4,100,324 A | 7/1978 | Anderson et al. | |
| 4,144,370 A | 3/1979 | Boulton | |
| 4,148,318 A | 4/1979 | Meyer | |
| 4,291,697 A | 9/1981 | Georgevich | |
| 4,318,818 A | 3/1982 | Letton et al. | |
| 4,330,220 A | 5/1982 | Schaar et al. | |
| 4,340,563 A | 7/1982 | Appel et al. | |
| 4,415,288 A | 11/1983 | Gordon et al. | |
| 4,430,013 A | 2/1984 | Kaufman | |
| 4,469,463 A | 9/1984 | Van Overloop | |
| 4,475,835 A | 10/1984 | Verboom et al. | |
| 4,478,530 A | 10/1984 | Van Overloop | |
| 4,525,091 A | 6/1985 | Van Overloop | |
| 4,526,773 A | 7/1985 | Weber | |
| 4,545,180 A | 10/1985 | Chung et al. | |
| 4,563,103 A | 1/1986 | Van Overloop et al. | |
| 4,576,817 A | 3/1986 | Montgomery et al. | |
| 4,578,265 A | 3/1986 | Pellico et al. | |
| 4,638,913 A | 1/1987 | Howe, Jr. | |
| 4,657,802 A | 4/1987 | Morman | |
| 4,659,609 A | 4/1987 | Lamers et al. | |
| D290,292 S | 6/1987 | Gatarz | |
| 4,784,506 A | 11/1988 | Koreska et al. | |
| 4,805,767 A | 2/1989 | Newman | |
| 4,818,464 A | 4/1989 | Lau | |
| 4,828,556 A | 5/1989 | Braun et al. | |
| 4,833,003 A | 5/1989 | Win et al. | |
| 4,885,155 A | 12/1989 | Parran, Jr. et al. | |
| 4,948,427 A | 8/1990 | Yamagishi et al. | |
| 4,978,232 A | 12/1990 | Dunton | |
| 5,048,589 A | 9/1991 | Cook et al. | |
| 5,059,035 A | 10/1991 | Kristensen | |
| 5,090,832 A | 2/1992 | Rivera et al. | |
| 5,094,559 A | 3/1992 | Rivera et al. | |
| 5,270,337 A | 12/1993 | Graf | |
| 5,273,514 A | 12/1993 | Kristensen | |
| 5,284,703 A | 2/1994 | Everhart et al. | |
| 5,284,871 A | 2/1994 | Graf | |
| 5,348,943 A | 9/1994 | Pickart | |
| 5,350,624 A | 9/1994 | Georger et al. | |
| 5,380,110 A | 1/1995 | Festa | |
| 5,382,400 A | 1/1995 | Pike et al. | |
| 5,399,412 A | 3/1995 | Sudall et al. | |
| 5,441,355 A | 8/1995 | Moore | |
| 5,510,001 A | 4/1996 | Hermans et al. | |
| 5,591,309 A | 1/1997 | Rugowski et al. | |
| 5,591,510 A | 1/1997 | Junker et al. | |
| 5,620,779 A | 4/1997 | Levy et al. | |
| 5,637,194 A | 6/1997 | Ampulski et al. | |
| 5,654,164 A | 8/1997 | Gardiol et al. | |
| 5,695,868 A | 12/1997 | McCormack | |
| D390,708 S | 2/1998 | Brown | |
| 5,772,845 A | 6/1998 | Farrington, Jr. et al. | |
| 5,791,801 A | 8/1998 | Miller | |
| 5,792,213 A | 8/1998 | Bowen | |
| 5,804,401 A | 9/1998 | Gardiol et al. | |
| 5,843,056 A | 12/1998 | Good et al. | |
| 5,891,422 A | 4/1999 | Pan et al. | |
| 5,911,915 A | 6/1999 | Fonsny et al. | |
| 5,916,862 A | 6/1999 | Morelli et al. | |
| 5,942,482 A | 8/1999 | Zocchi et al. | |
| 5,962,112 A | 10/1999 | Haynes et al. | |
| 5,994,283 A | 11/1999 | Durbut et al. | |
| 6,017,417 A | 1/2000 | Wendt et al. | |
| D428,267 S | 7/2000 | Romano, III et al. | |
| 6,093,665 A | 7/2000 | Sayovitz et al. | |
| 6,103,061 A | 8/2000 | Anderson et al. | |
| 6,147,039 A | 11/2000 | Jacques et al. | |
| 6,156,421 A | 12/2000 | Stopper et al. | |
| 6,197,404 B1 | 3/2001 | Varona | |
| 6,200,941 B1 | 3/2001 | Strandburg et al. | |
| 6,215,038 B1 | 4/2001 | Davis et al. | |
| 6,248,125 B1 | 6/2001 | Helming | |
| 6,303,046 B1 | 10/2001 | Risen, Jr. et al. | |
| 6,303,557 B1 | 10/2001 | Colclough | |
| 6,315,864 B2 | 11/2001 | Anderson et al. | |
| 6,409,770 B1 | 6/2002 | Weiss et al. | |
| 6,432,270 B1 | 8/2002 | Liu et al. | |
| 6,508,602 B1 | 1/2003 | Gruenbacher et al. | |
| 6,588,961 B2 | 7/2003 | Lafosse-Marin et al. | |

FOREIGN PATENT DOCUMENTS

| | | |
|---|---|---|
| EP | 0074161 A2 | 3/1983 |
| EP | 0307376 | 3/1989 |
| EP | 0369678 | 5/1990 |
| EP | 0517566 B1 | 12/1992 |
| EP | 0442292 B1 | 3/1994 |
| EP | 0603931 | 6/1994 |
| EP | 0675703 B1 | 5/1998 |
| EP | 0841049 A1 | 5/1998 |
| EP | 1046591 A2 | 10/2000 |
| GB | 1225713 | 3/1971 |
| JP | 55017571 | 2/1980 |
| JP | 56030869 | 3/1981 |
| JP | 58191167 | 11/1983 |
| JP | 60021255 | 2/1985 |
| JP | 62049932 | 3/1987 |
| JP | 63147652 | 6/1988 |
| JP | 02290201 | 11/1990 |
| JP | 4147863 | 5/1992 |
| JP | 5017712 | 1/1993 |
| JP | 5320549 | 12/1993 |
| JP | 7097597 | 4/1995 |
| JP | 9031378 | 2/1997 |
| JP | 10060339 | 3/1998 |
| JP | 10202910 | 8/1998 |
| WO | 9007296 | 7/1990 |
| WO | WO 9111105 | 8/1991 |
| WO | WO 9638548 | 12/1996 |
| WO | WO 9707729 | 3/1997 |
| WO | WO 9928411 | 6/1999 |
| WO | WO 0078861 A1 | 12/2000 |
| WO | WO 03106333 | 12/2003 |

OTHER PUBLICATIONS

U.S. Patent Application Publication No. 2003/0135181, Jul. 17, 2003.
U.S. Patent Application Publication No. 2004/0053803, Mar. 18, 2004.
Co-pending U.S. Appl. No. 10/844,568, filed Apr. 30, 2004.
www.drugstore.com/templates/brand/default.asp?brand=7840, Sep. 4, 2002.
Co-pending U.S. Appl. No. 11/215,816, filed Aug. 30, 2005.
Co-pending U.S. Appl. No. 11/217,110, filed Aug. 31, 2005.

* cited by examiner

FLUID APPLICATOR WITH A PULL TAB ACTIVATED POUCH

BACKGROUND

Cleaning pads, wipes, and other similar devices are know that include a fluid containing pouch or bladder that is ruptured or otherwise breached to dispense the fluid through a layer of the device. Typically, the bladders are designed to burst along a frangible seam or portion when pressure is applied to the device, and therefore to the bladder. Such devices are, however, not selective and burst under sufficient pressure, regardless of whether that pressure is applied intentionally by a user, or is applied unintentionally during handling, shipping, or storage.

U.S. Pat. No. 6,508,602 describes an applicator intended to distribute a fluid from an enclosed reservoir when pressure is applied to the applicator causing the reservoir to rupture. To prevent the reservoir from bursting prematurely, the '602 patent proposes to fold the entire applicator such that the reservoir within the applicator is also folded along an axis that isolates the rupturable portion of the reservoir. The applicator must be folded prior to packaging and maintain in this folded state. To use the applicator, a consumer must unfold the device prior to inserting their hand into the applicator to apply sufficient pressure for bursting the reservoir. This configuration requires additional folding steps and packaging considerations, such as additional restraining structure or packaging materials to ensure that the applicator remains folded prior to use. This is not a desirable situation from a manufacturing and packaging standpoint.

SUMMARY

Objects and advantages of the invention will be set forth below in the following description, or may be obvious from the description, or may be learned through practice of the invention.

As noted, cleaning devices and other similar devices including pouches that contain fluids suffer from the problem of premature bursting of such pouches. The present invention proposes a solution to this problem by providing a fluid applicator, such as a cleaning pad or mitt, containing a soft, flexible pouch of fluid that is durable and designed not to burst during normal handling.

The present disclosure is directed generally to a fluid applicator device designed to deliver a fluid from an internal pouch. For ease of description only, aspects of the invention are explained herein by reference to a cleaning pad or mitt used to deliver any desired cleaning agent or composition contained within the internal pouch. However, it should be appreciated that the invention is not limited to such devices, and includes all embodiments of pads, wipes, mitts, finger or hand wipes, or any other fluid applicator incorporating the novel aspects of the invention.

The fluid applicator may be a disposable, absorbent or non-absorbent article in the form of a pad or a mitt structure that fits on one or more fingers or the hand of the user. Such a device may be used, for example, to apply a cleaning agent or composition to a surface while cleaning the surface with the mitt. The applicator can be used to clean various utensils, objects or surfaces and/or to polish various items with any number of compositions or agents carried by the wipe. The applicator may also be used to clean or treat parts of the body, or to apply a medicine, lotion, ointment, cleaning agent, or the like to any part of the body, or any other object. The applicator may be a mitt structure designed to fit on a single finger, such as a dental finger wipe used to apply a cleaning agent to the user's teeth or gums. All such uses of a fluid applicator are contemplated within the scope and spirit of the invention.

In a particular embodiment, the fluid applicator includes a wipe layer that is permeable to the fluid composition within the internal pouch. The wipe layer may be a nonwoven material having a textured outer surface to enhance the scrubbing or cleaning effect of the wipe layer. The internal pouch is disposed adjacent the wipe layer, and the fluid composition is delivered through the wipe layer upon use of the applicator. The applicator may include a fluid impermeable back layer, with the pouch disposed in a space between the wipe layer and the back layer. In a mitt or finger wipe embodiment, an additional material layer is disposed so as to define a space between the back layer and the additional layer for accommodating a user's hand or fingers. This additional layer may be a separate panel of material or a folded extension of the same material defining the wipe layer.

The internal pouch may be defined by opposed first and second material layers sealed along a perimeter seal to define a sealed cavity. Exit structure is defined through the first material layer, and may be one or more openings, such as a series of holes or slits in the material layer, or a weakened portion of the pouch material, such as a thinned portion. The exit structure may be a burstable seal or seam. The exit structure communicates with the internal cavity of the pouch in which the fluid composition is contained.

Baffle structure may be provided in the cavity to aid in controlling the flow rate of the composition out of the pouch. The baffle structure may be defined by one or more seals between the opposed material layers of the pouch.

A flap is defined by a portion of the opposed pouch material layers folded at a first fold line so as to extend over and releasably seal to the first material over the exit structure. The flap has an extension end that extends outwardly from the wipe layer a sufficient distance so as to be grasped by a user. To use the fluid applicator, the user pulls the flap extension causing the flap peel away from the first material layer and unseal from over the exit structure. The fluid composition is delivered out of the pouch through the exit structure upon pressure being applied to the pouch and migrates through the wipe layer.

In a particular embodiment, a seal line between the opposed material layers may be provided between the flap and the cavity, with the flap folded over at this seal line so as to extend over the exit structure in a first pass (and seal to the first material layer). The flap may be folded in an opposite direction at a second fold line so as to extend back over the exit structure in a second pass before the flap extension extends outwardly from the wipe layer. The flap may be releasably sealed to the second material layer adjacent the second fold line, although this is not a necessity.

The pouch material layers can vary. In certain embodiments, laminated metallized films may be desired depending on the nature or the fluid composition within the pouch. In a particular embodiment, the opposed material layers of the pouch include heat sealable thermoplastic materials, such as thermoplastic film layers, heat-sealed together along a perimeter seal using conventional heat seal techniques. The flap may be heat sealed directly to the first material layer over the exit structure in a seal zone that circumscribes the exit structure. The seal zone may be a border around the exit structure, or a continuous seal zone that encompasses the exit structure. In this embodiment, the first material layer may have an outer surface or layer with heat seal characteristics different from those of an inner surface of the material. In this way, the flap may be heat-sealed against the first material layer at heat seal conditions (i.e., temperature, dwell time, and pressure) different from those needed to heat seal the opposed material layers together along the perimeter seal. The flap seal may thus be considered weaker or "frangible" as compared to the perimeter seal defining the cavity, or other pouch structure. The first material layer may be, for example, a multi-layered film with different layers having different melt points. The layers may be co-extruded or laminated layers, with one of the outer surface layers including a sealant material or coating, such as Surlyn® from Dupont, or a blend of polybutylene with ethylene vinyl acetate or ultra low density ethylene copolymers, polyolefin plastomers, or polyethylene. Sealant layers made with these resins or blends provide different seal strengths depending upon seal temperature, dwell time, and pressure as compared to the base polymer material. Thus, the seal between the flap and outer surface of the first material layer can be made selectively frangible as compared to the permanent perimeter seal defining the packet cavity by varying the sealing conditions.

The second material layer may be the same or a different thermoplastic film as compared to the first material layer.

In still another embodiment, the flap is folded at a second fold line disposed such that the exit structure (with sealed flap) is folded in an opposite direction so as to lie adjacent to the second material layer. In this configuration, the exit structure is isolated from the contents of the cavity by the second fold line. The flap is releasably sealed to second material layer adjacent to the second fold line. In this embodiment, the opposed material layers may be thermoplastic materials heat-sealed together along a perimeter seal defining the cavity. The flap is heat sealed directly to the first material layer over the exit structure in a seal zone that circumscribes the exit structure, and may be heat-sealed directly to the second material layer adjacent the second fold line. The first and second material layers may be multi-layer films having an outer sealant layer as discussed above with heat seal characteristics such that the flap heat seals against the first and second material layers in a frangible, releasable seal as compared to the perimeter seal defining the cavity.

With yet another embodiment, the pouch may be defined by a combination of opposed material layers heat sealed together along a perimeter seal defining the cavity, with the flap heat sealed directly to the first material layer over the exit structure in a seal zone that circumscribes the exit structure. The flap seal is formed at a temperature, dwell time, and pressure so as to be frangible as compared to the perimeter seal. In order to prevent the opposed layers from sealing to each other in the flap seal zone when heat sealing the flap to the first material layer, an insert device may be disposed within the cavity at a location relative to the seal zone to prevent the material layers from sealing together within the cavity. The insert may be any material that will not seal to both of the opposed material layers upon heat-sealing the flap to the first material layer. In a particular embodiment, the insert may be a strip of thermoplastic material having at least one surface that will not heat seal to the opposed material layers. The opposite surface may have a sealant layer so that the insert material seals to the bottom material layer within the cavity. The insert thus defines a channel or conduit to ensure that the fluid composition is free to flow out of the exit structure upon the flap being peeled away from the first material layer.

The applicator wipe layer and back layer may be attached along a perimeter seam except for an opening through which the flap extension extends. This opening may be anywhere along the perimeter depending on orientation of the pouch with the device.

Aspects of the invention will be described in greater detail below by reference to particular embodiments illustrated in the figures.

DETAILED DESCRIPTION OF THE PREFERRED EMBODIMENTS

Reference will now be made in detail to one or more embodiments of the invention, examples of which are illustrated in the drawings. The embodiments are provided by way of explanation of the invention, and are not meant as a limitation of the invention. Features illustrated or described as part of one embodiment may be used with another embodiment to yield still a different embodiment. It is thus intended that the present invention include modifications and variations to the embodiments illustrated and described herein.

Aspects of the invention are described herein by reference to a cleaning pad or a mitt structure designed to fit onto a user's fingers or hand. It should be appreciated that the invention is not limited to such a device, and is applicable to any applicator intended to deliver a fluid composition from an internal pouch for any purpose. The invention is not limited to any particular type of fluid composition or intended use of the applicator.

Figure 1A:
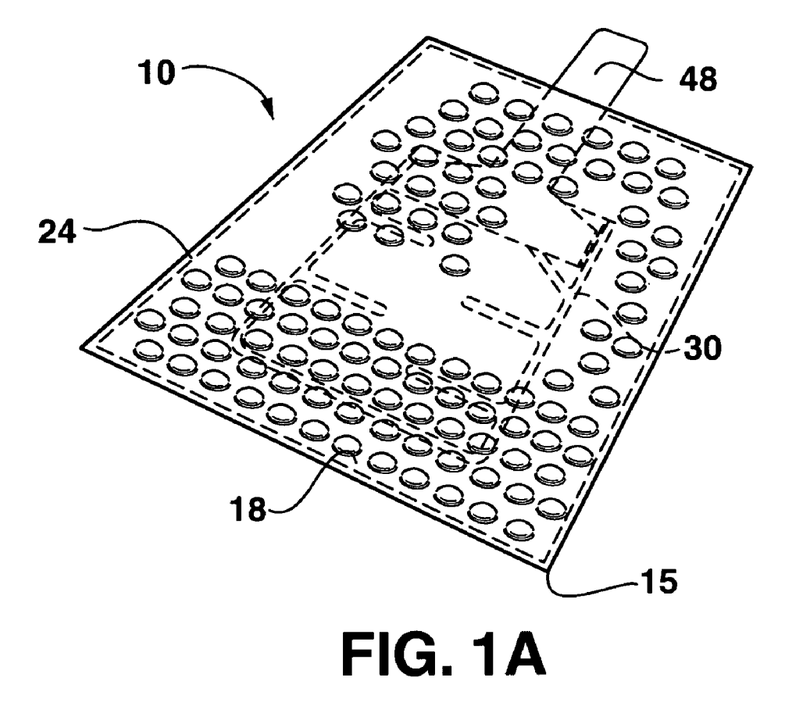
FIG. 1A is a perspective view of a pad embodiment according to the present invention.
Figure 1B:
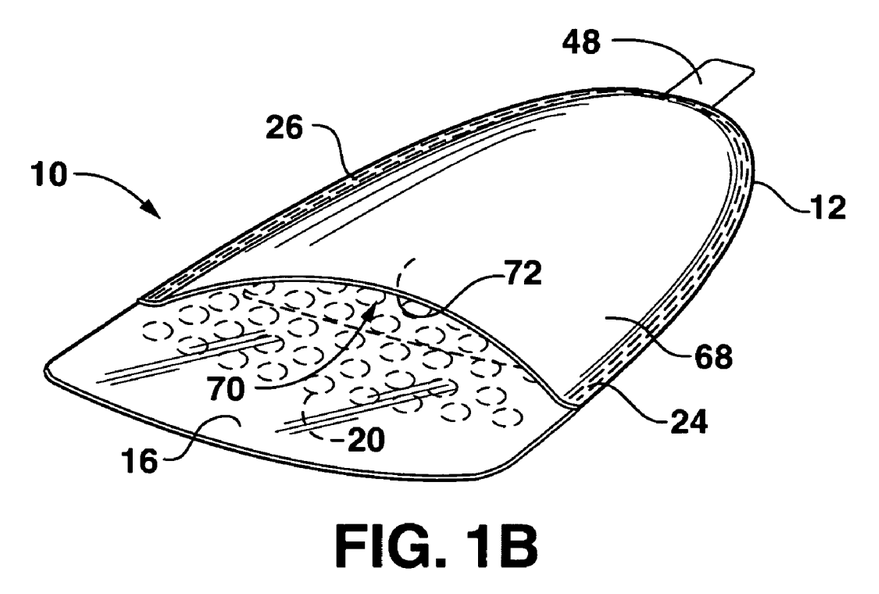
FIG. 1B is a perspective view of a mitt or hand wipe embodiment of the present invention.
Figure 2:
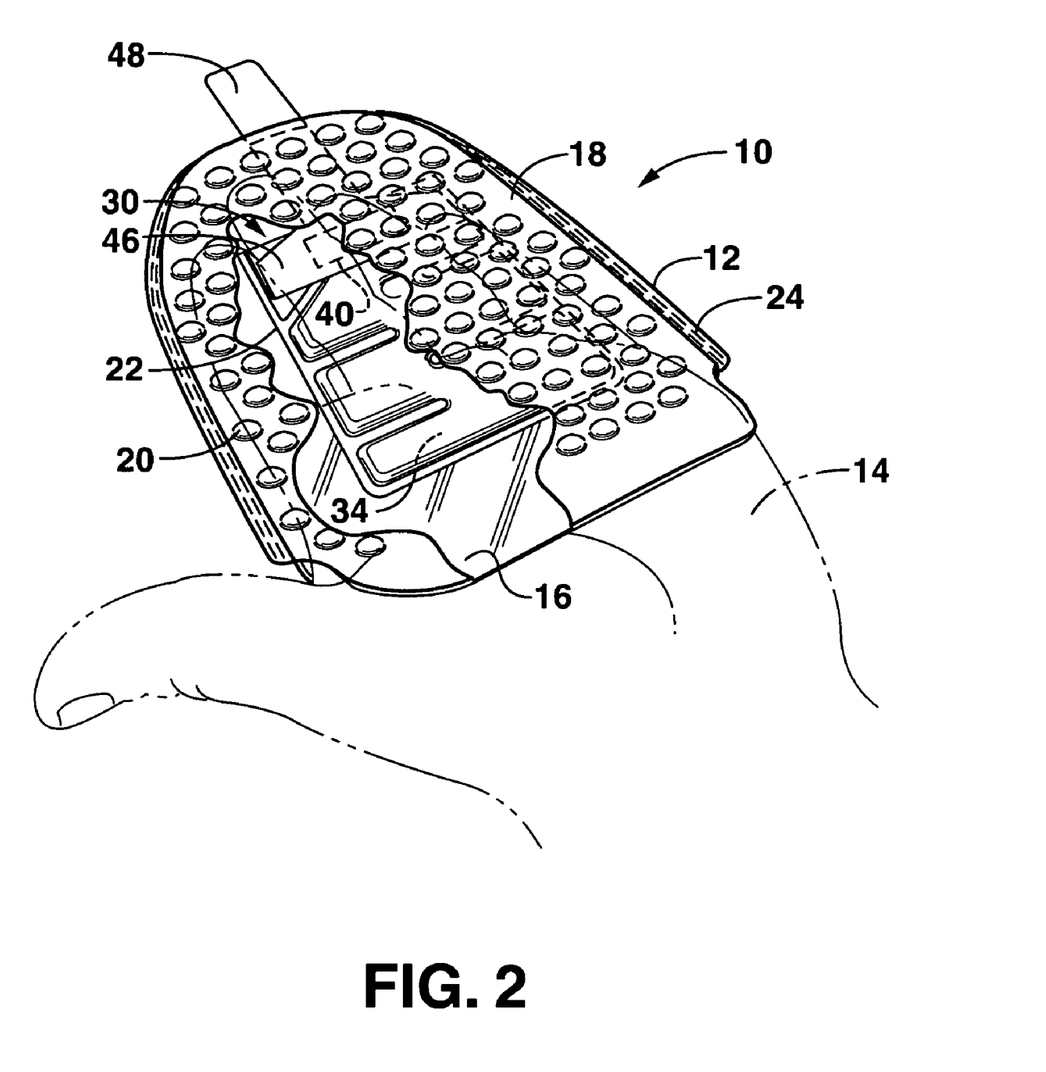
FIG. 2 is a perspective and partial cut-away view of a mitt embodiment according to the invention.
Figure 3A:
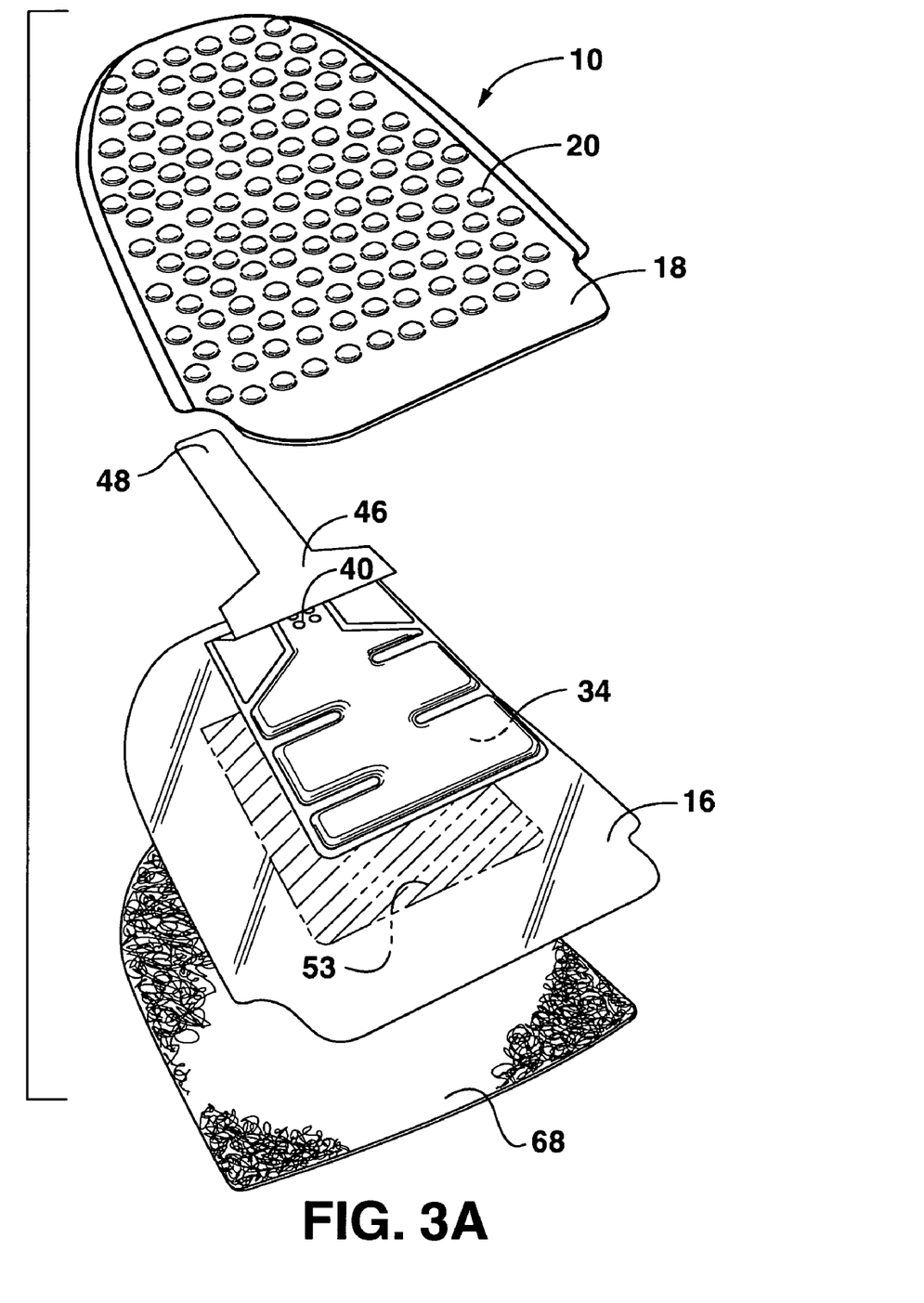
FIG. 3A is a component view of a mitt embodiment of the invention.

Referring to the figures in general, various embodiments of an applicator 10 are illustrated. In the embodiment of FIG. 1A, the applicator 10 is depicted as a pad structure 15. In the embodiment of FIGS. 1B and 2, the applicator is a mitt structure 12. FIG. 3a is a component view of the embodiment illustrated in FIGS. 1B and 2. In any suitable configuration, the applicator 10 is intended for delivering a fluid composition 35 from a pouch 30 contained within the applicator 10. As discussed in greater detail below, the pouch 30 is sealed by a folded flap 46, and the pouch is opened by the user pulling on an extension 48, which causes the flap 46 to unfold and expose particular exit structure in the pouch through which the fluid composition 35 migrates.

The applicator 10 includes a wipe layer 18 through which the fluid composition 30 is delivered in use of the applicator. The wipe layer 18 is attached to a back layer 16 around a perimeter seam 24 by any conventional bonding method suitable for the selected materials, including adhesives, thermal bonding, ultrasonic bonding, welding, stitching, and so forth. In one aspect of the present invention, the wipe and back layers 18, 16 are attached using a block copolymer adhesive such as 34-5610 construction adhesive available from National Starch. The wipe and base layers 18, 16 may also be attached at locations in addition to or other than the perimeter seam 24.

An interior space 22 is defined between the wipe layer 18 and back layer 16, and the pouch 30 is disposed within this space 22. The wipe layer 18 may be about the size of a human hand held flat on a surface. In an alternate embodiment, the wipe layer 18 is generally the size of the four fingers of a human hand. In still another embodiment, the applicator may be designed as a finger wipe wherein the wipe layer 18 is generally the size of a human finger. In other embodiments, the applicator 10 can be manufactured into other shapes such as a square or round pad, and so forth.

The wipe layer 18 is an active layer, which delivers the fluid composition 35 and performs a cleaning function. Any suitable material that is permeable to the fluid composition 35 may be used, including coform, nonwoven, or woven materials. In particular embodiments, the wipe layer 18 may be an absorbent material. The wipe layer 18 may be a stretch-bonded laminate (SBL) with pre-stretched elastic filament and meltblown material with one ply of spunbond material on each outer surface and a basis weight of approximately 70 gsm, but any suitable absorbent material may be used. SBL and other composite nonwoven elastic webs are further described in U.S. Pat. No. 4,657,802 to Morman. In one aspect of the present invention, the wipe layer 18 includes a dry embossed 110 grams per square meter (gsm) coform laminate available from Kimberly-Clark Corporation.

In other aspects of the present invention, materials for the wipe layer 18 may include cotton, rayon, wood pulp, and polymeric substances such as nonwoven fabrics, foam sponges, and thermoplastics. The material maybe formed of a nonwoven fabric that is made of interbonded thermoplastic fibers. The fibers may be formed from a variety of thermoplastic materials including polyolefins (e.g., polyethylene or polypropylene), polystyrene, and polyamides (e.g., nylon). In addition, thermoplastic polymers that are elastomeric may also be used as fibers, including polyurethanes and block copolymers. Blends of any of these materials may be used to form the fibers. The fibers may include additives (e.g., wax, pigments, stabilizers, and fillers) that are inserted as the fibers are fabricated to achieve one or more desired properties within the fibers. Some example additives include compatible surfactants that are added to the polymers to make the surface of the fibers more wettable, thereby improving the ability of the fiber structure to attract unwanted debris away from the skin. The amount of surfactant added to the fibers can be adjusted to control the surface wetting of the fabric formed from the fibers. Examples of suitable surfactants include sodium dioctyl sulfosuccinate and alkyl phenoxy ethanol.

The back layer 16 is preferably of the same general size and shape as the wipe layer 18, although this is not a requirement. In particular embodiments, the back layer 16 is liquid impermeable so that the fluid composition 35 migrates only through the wipe layer 18. This may be desired in the mitt embodiments of the applicator 10 to protect the user's hand or fingers from contact with the fluid composition 35. In this regard, the back layer 16 may include a liquid impermeable barrier layer facing the interior space 22. This barrier layer may be a polyolefin-type material that can be heat sealed or ultrasonically sealed. The back layer may be a single or multi-layer film, or a laminate of a nonwoven material and a film. In another aspect, the barrier layer may be a material such as BSTL, a breathable, stretchable, thermal laminate. BSTL and similar materials are described in U.S. Pat. No. 5,695,868 to McCormack et al. and U.S. Pat. No. 5,843,056 to Good et al. In yet another aspect of the present invention, the barrier layer may be SBL as described above, or may be any other suitable material, particularly those described above with reference to the wipe layer 15. A barrier layer may also be positioned adjacent a portion of the wipe layer 18 to occlude a portion of the wipe layer 18 from fluid contact, allowing that portion of the wipe layer 18 to remain dry.

In certain embodiments, for example cleaning pad applicators, it may be desired that the back layer 16 is also an active layer. In this regard, the back layer 16 may be made of any one or combination of the materials described above as suitable for the wipe layer 18.

When the applicator 10 is used to scrub surfaces or in dental applications as a finger wipe, the active surfaces may include a texturized surface. When used in dental applications, for instance, the texturized surface can facilitate removal of residue and film from the teeth and gums. The manner in which a texturized surface is formed on a nonwoven web for use in the present invention can vary depending upon the particular application of the desired result. The active surfaces may be made from a nonwoven web that has been thermally point unbonded to form a plurality of tufts 20, as illustrated for example in FIG. 2. As used herein, a substrate that has been "thermally point unbonded" refers to a substrate that includes raised unbonded areas or lightly bonded areas that are surrounded by bonded regions. For example, as shown in the figures, bumps or tufts 20 are the unbonded or lightly bonded areas that form raised projections off the surface of the nonwoven web to provide the necessary texture.

The material used for the point unbonding process can vary depending upon the particular application. For instance, the material can be a single layer or can include multiple layers of material. For most applications, the total basis weight of the material should be at least 1 osy, and particularly from about 3 osy to about 9 osy. Higher basis weights are needed in order to produce tufts with an appropriate height.

Besides point unbonded materials, there are many other methods for creating texturized surfaces on base webs and many other texturized materials can be utilized. Examples of known nonwoven, texturized materials, include rush transfer materials, flocked materials, wireformed nonwovens, and the like. Moreover, through-air bonded fibers, such as through-air bonded bicomponent spunbond, or point unbonded materials, such as point unbonded spunbond fibers, can be incorporated into the base web to provide texture to the wipe.

Textured webs having projections from about 0.1 mm to about 25 mm, such as pinform meltblown or wireform meltblown, can also be utilized in a base web of the present invention. Still another example of suitable materials for a texturized base web includes textured coform materials. In general, "coform" means a process in which at least one meltblown diehead is arranged near a chute through which other materials are added to the web while it forms. Such other materials can include, for example, pulp, superabsorbent particles, or cellulose or staple fibers. Coform processes are described in U.S. Pat. No. 4,818,464 to Lau and U.S. Pat. No. 4,100,324 to Anderson, et al. Webs produced by the coform process are generally referred to as coform materials.

In one embodiment, the texturized material can be a loop material. As used herein, a loop material refers to a material that has a surface that is at least partially covered by looped bristles that can vary in height and stiffness depending upon the particular application. Further, the looped bristles can be sparsely spaced apart or can be densely packed together. The loop material can be made in a number of different ways. For example, the loop can be a woven fabric or a knitted fabric. In one embodiment, the loop material is made by needle punching loops into a substrate. In other embodiments, the loop material can be formed through a hydroentangling process or can be molded, such as through an injection molding process. Of course, any other suitable technique known in the art for producing looped bristles can also be used.

Figure 3B:
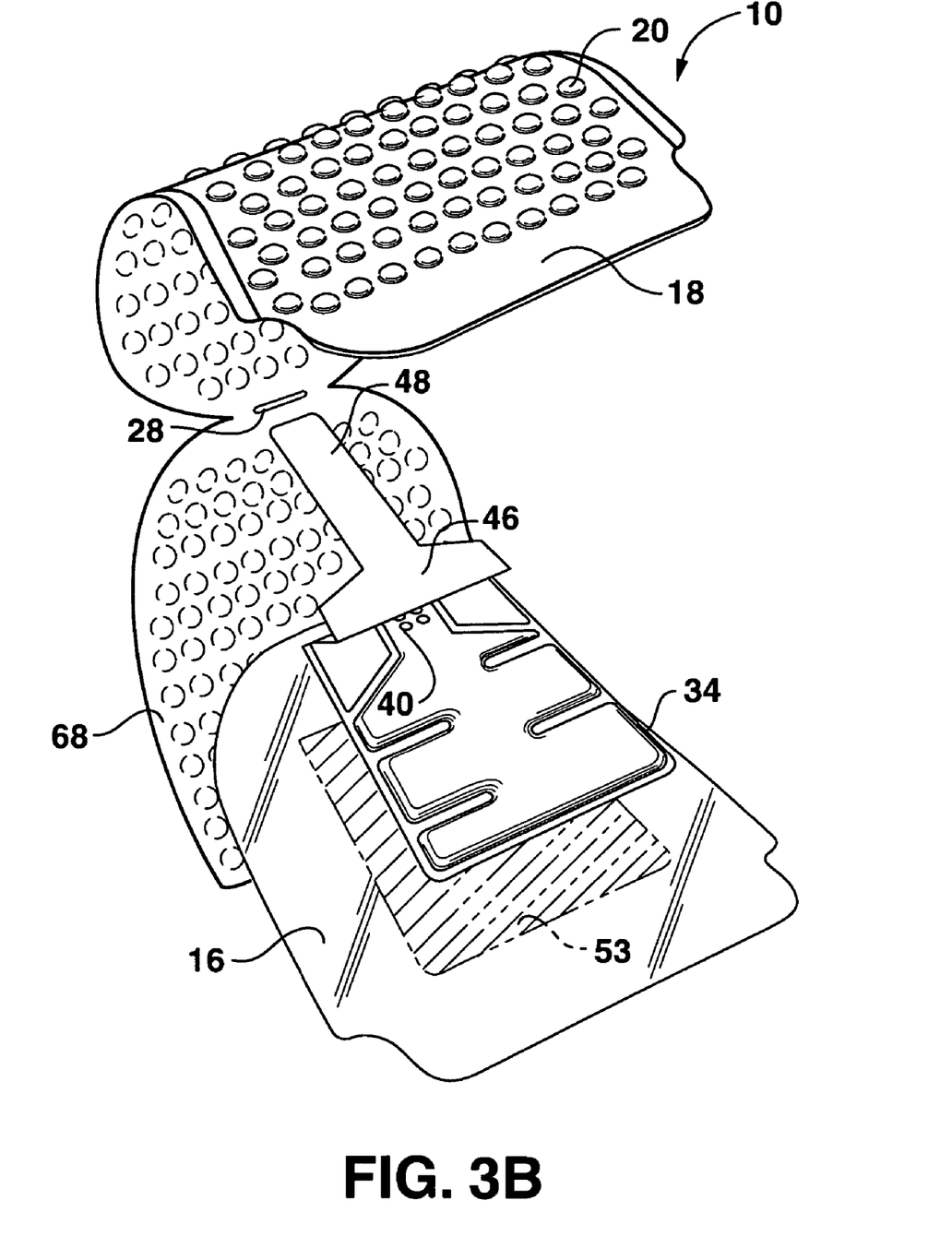
FIG. 3B is a component view of an alternate mitt embodiment of the invention.

With the mitt or finger wipe embodiments of the applicator 10, an additional material layer 68 is attached to the wipe layer 18 and back layer 16 so as to form an internal space between the back layer 16 and additional material layer 68, as illustrated for example I FIGS. 1B and 2. An opening 70 is provided to this space so that a user may slip their hand or fingers into the space when donning the applicator 10. The additional material layer 68 may be formed from any suitable woven or nonwoven material, film, laminate, and the like. In particular applications, the material layer 68 may be formed from the same material as the wipe layer 18. In the embodiment of FIG. 3B, the material layer 68 is an extension of the wipe layer 18 folded at a fold line that defines a longitudinal end of the applicator 10. It may be desired for the material layer 68 to be elastomeric so as to provide the mitt structure with form-fitting characteristics.

FIG. 3B illustrates an alternate embodiment wherein the wipe layer 18 and additional layer 68 used to form the space for the user to insert their hand are formed from the same piece of material that is folded to define the layer 68 and wipe layer 18, as illustrated in figure. An opening 28 is provided along the fold line to accommodate a flap extension tab 48, as described in greater detail below.

By virtues of the design and materials chosen for the applicator 10, the applicator is preferably designed to be disposable. In this case, disposable means that the device 10 is disposed of, rather than cleaned, after use.

As seen in various figures, the pouch 30 contained within the applicator 10 defines a cavity 34 in a first portion 36 (FIG. 4) of the pouch 30. The fluid composition 35 is contained within the cavity 34. The pouch may be formed from opposed material layers 32, 33 attached together to define the sealed cavity 34, as seen for example in FIG. 4. The opposed layers 32, 33 may attached by thermal bonding, although any suitable attachment method may be used depending on the type of material selected for the layers 32, 33.

The pouch 30 may be any size that fits within the interior space 22 between the opposed material layers 32, 33, with the size selected based on the fluid composition 35 and the intended use of the applicator 10. The pouch 30 can be sized to provide a level of over saturation that permits the fluid to soak through the wipe layer 18, permitting it to be absorbed by the intended surface. An example of this would be a stain removal cloth for carpet cleaning where it is desired to soak the stain.

The pouch material layers 32, 33 may be made from any suitable flexible material that is impermeable to the fluid composition 35 contained in the pouch 30. The pouch materials should have no negative impact on or reaction with the fluid 35 contained in the pouch 30. The materials used in the construction of the pouch 30 and the fill level of the fluid within the pouch 30 create a structure that is durable and flexible, and one that is not easily burst open during normal handling. The pouch 30 may be formed from the layers 32, 33 using any conventional attaching techniques, such as adhesives, stitching, welding, and so forth. In particular embodiments, the layers 32, 33 are a heat sealable thermoplastic material, such as a polyethylene or polypropylene film, or other suitable thermoplastics. The layers may also be metallized films. It should be appreciated that the bonding or attaching techniques used to form the pouch 30 and associated structure will be a function of the type of materials selected for layers 32, 33.

The pouch 30 may include one or more bond points or seals between the opposed layers to define the cavity 34, or other features of the pouch. For example, referring to FIG. 4A, the pouch 30 includes bond lines 60 that define a perimeter seal and baffles 58 within the cavity 34, the baffles 58 serving to control flow rate of the fluid composition from the cavity 34. Additional bond lines 56 define a nozzle 54 oriented towards the exit structure 40.

Exit structure 40 is provided in a first of the pouch material layers, such as layer 32, through which the fluid composition 35 flows in use of the applicator 10. Configuration of the exit structure 40 can vary. For example, the structure 40 may comprise any pattern of holes, slits, apertures, or other openings defined completely through the material layer 32. In alternate embodiments, the exit structure 40 may be weakened positions in the pouch material or seam structure designed to rupture or burst upon pressure being exerted on the pouch. Such weakened positions may be created by embossing, laser scoring, mechanical scoring, or other known methods for weakening a film structure.

Figure 4A:
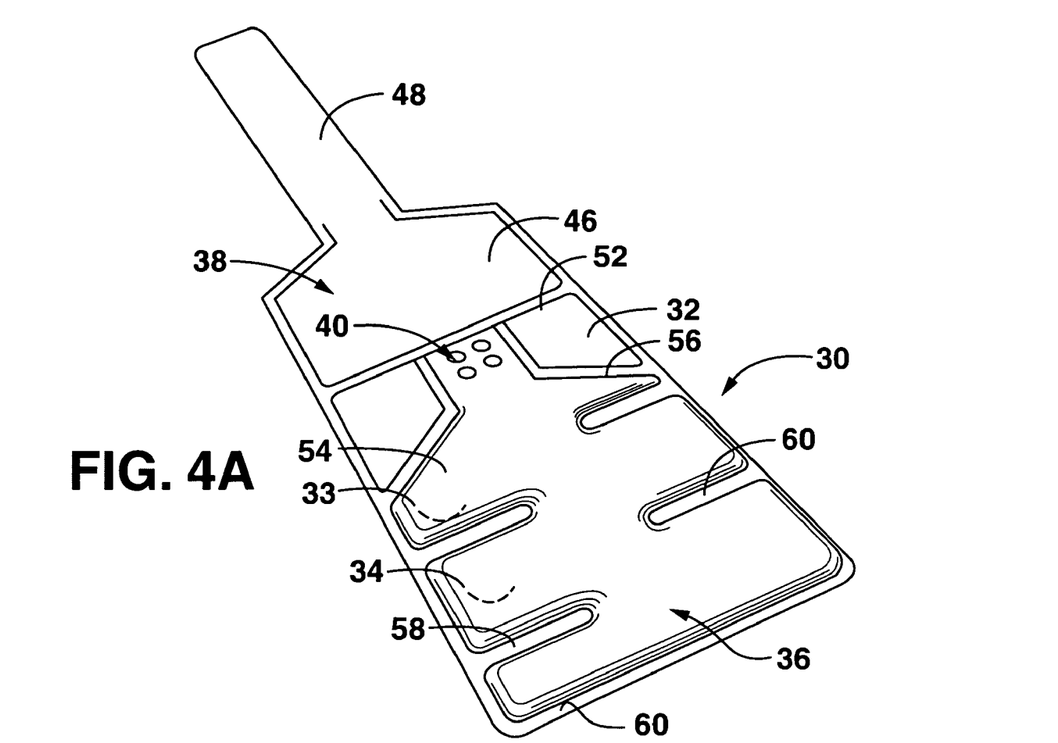
FIG. 4 is a perspective view of a pouch configuration.
Figure 4B:
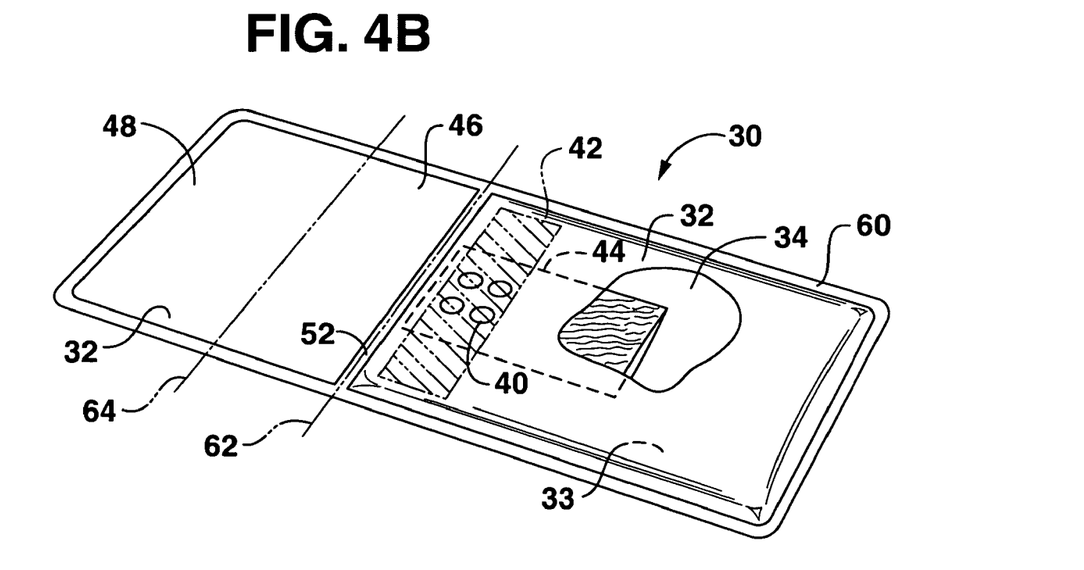
Figure 5A:
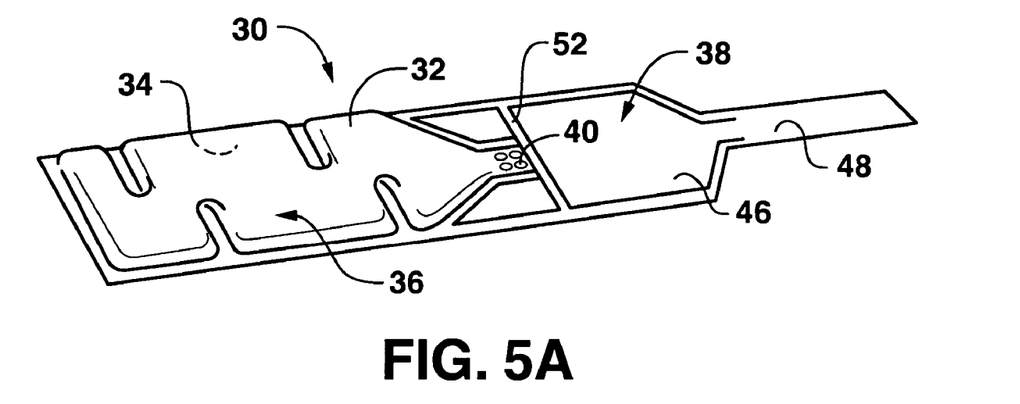
FIGS. 5A through 5C are sequential perspective views of a pouch folded in accordance with aspects of the invention.
Figure 5B:
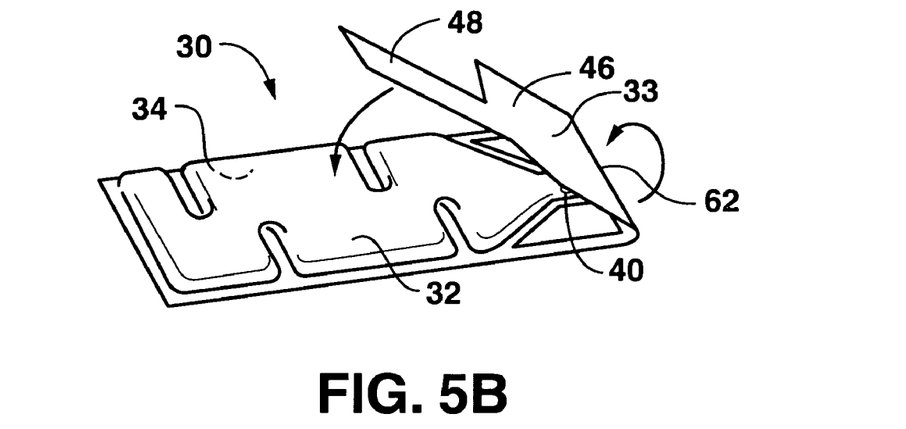
Figure 5C:
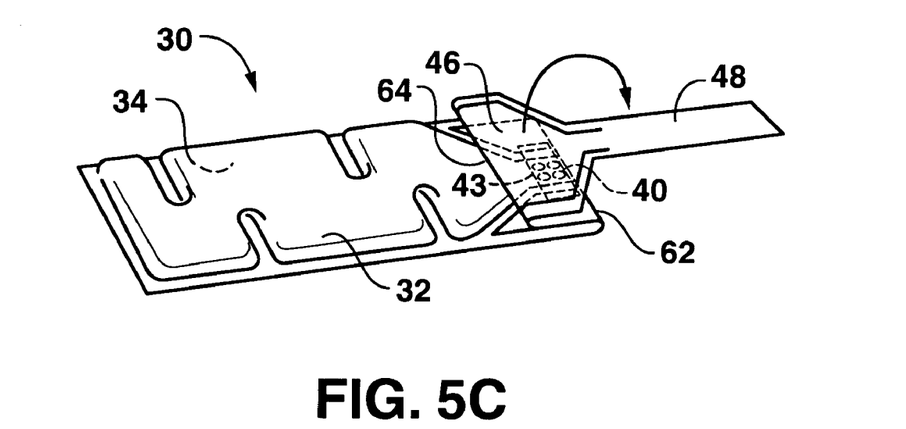

The pouch 30 incorporates a flap 46 that is formed from an extension of the opposed pouch material layers 32, 33 that may be sealed together in a second portion 38 (FIG. 4) of the pouch 30 that is adjacent to the first portion 36 containing the cavity 34, as particularly illustrated in FIGS. 4A and 4B. As illustrated in FIGS. 5A through 5C, the flap 46 may be folded at a first fold line 62 that corresponds to a seal line 52 used to define a longitudinal end of the cavity 34. The flap 46 is folded so as to extend back over the pouch 30 a sufficient distance to cover and releasably seal to the first material layer 32 over the exit structure 40, as particularly seen in FIG. 5B. The seal between the flap 46 and material layer 32 is designed to be releasable or frangible so that the flap 46 can be subsequently peeled away from the material layer 32 to expose the exit structure 40 without otherwise compromising the pouch integrity. For example, a releasable adhesive may be disposed between the flap 46 and material layer 32 for this purpose.

Referring to FIG. 5C, the flap 46 may be folded at a second fold line 64 in an opposite direction so as to extend back over the exit structure. This additional fold may be releasably attached to the first fold adjacent the second fold line 64, although this is not a necessity.

In particular embodiments of the pouch 30, the opposed material layers 32, 33 are thermoplastic materials, such as thermoplastic film layers, heat sealed together along a perimeter seal to define cavity 34, and also baffles 58 and nozzle structure 54 if desired. With thermoplastic materials, the flap 46 may be heat sealed directly to the first material layer 32 over the exit structure 40 in a seal zone 42 (FIG. 4B) that circumscribes the exit structure 40. The seal zone 42 may be a border seal around the exit structure 40, such as the seal 43 indicated in FIG. 5C, or a continuous seal that encompasses the exit structure 40. For example, the first material layer 32 may have an outer surface layer with heat seal characteristics (i.e. temperature, dwell time, and pressure) different than those of an inner surface layer of the material 32. In this way, the flap 46 may be heat sealed directly against the first material layer 32 at conditions different than those needed to heat seal the opposed material layers 32, 33 together along the perimeter seal. The flap seal may thus be considered weaker or "frangible" as compared to the perimeter seal defining the cavity 34, or other packet structure.

The material layer 32 may be a multi-layered film with different layers having different heat seal characteristics. The layers may be co-extruded or laminated layers, with one of the outer surface layers including a sealant material or coating, such as Surlyn® from Dupont, or a blend of polybutylene with ethylene vinyl acetate or ultra low density ethylene copolymers, polyolefin plastomers, or polyethylene. Sealant layers made with these resins or blends provide different seal strengths depending upon seal temperature, dwell time, and pressure as compared to the base polymer material. Thus, the seal between the flap 46 and outer surface of the first material layer 32 can be made selectively frangible as compared to the permanent perimeter seal defining the cavity 34 by varying the sealing conditions. Thus, the flap 46 can be heat sealed directly to the material layer 32 over the exit structure 40 without concern of the inner surfaces of the material layers 32, 33 being sealed together in the seal zone 42.

The second material layer 33 may be the same or a different thermoplastic film as compared to the first material layer 32, so long as a seal can be formed with the inner surface of the material layer 32.

Various multilayer thermoplastic films are commercially available and may be used to form pouches 30 as described herein. For example, a line of multilayer thermoplastic films under the name PERFECFLEX® films are available from Perfecseal, Inc. (a division of Bemis Company, Inc.) having a principal place of business in Oshkosh, Wis., USA. A particularly suitable film from Perfecseal, Inc., is identified as EZ PEEL® Polyethylene Film (product code 34466-G). This film is a multilayered PE film having a frangible sealant layer on one outer side of a core layer. For use as material layer 32, this film is oriented so that the frangible sealant layer is outwardly facing and, thus, defines the mating surfaces of the flap 46 and material surface 32 when heat sealing the flap 46 directly to the material 32. The EZ PEEL® film (without corona treatment on the opposite outer layer) may also be used as the opposite material layer 33, with the frangible sealant layer of the film outwardly disposed.

The flap 46 includes a longitudinally extending tab or extension 48 that extends outwardly from between the wipe layer 18 and back layer 16, as illustrated in FIGS. 1 through 3A. The extension 48 may have any desired shape or configuration and, for example, may be an extension of the flap 46, or have different lateral dimensions as compared to the flap 46. The extension 48 may simply extend through an unbonded opening in the perimeter seal 24, or through a defined opening 28 as illustrated in FIG. 3b. The extension 48 has a sufficient length so as to be grasped and pulled by a user when it is desired to use the applicator 10. When the extension 48 is pulled, the flap 46 is caused to unfold and release from the pouch material, and thereby uncover the exit structure 40. The fluid composition 35 within the cavity 34 is then free to migrate out of the exit structure 40 in the embodiment wherein the exit structure 40 includes holes or other openings through the pouch material. In the embodiment wherein the exit structure 40 includes a burstable seal, the pouch is activated by the user applying pressure to the pouch causing the exit structure to open. The fluid composition is then free to migrate into the interior space 22 between the wipe layer 18 and back layer 16, and to migrate through the wipe layer 18.

Figure 6A:
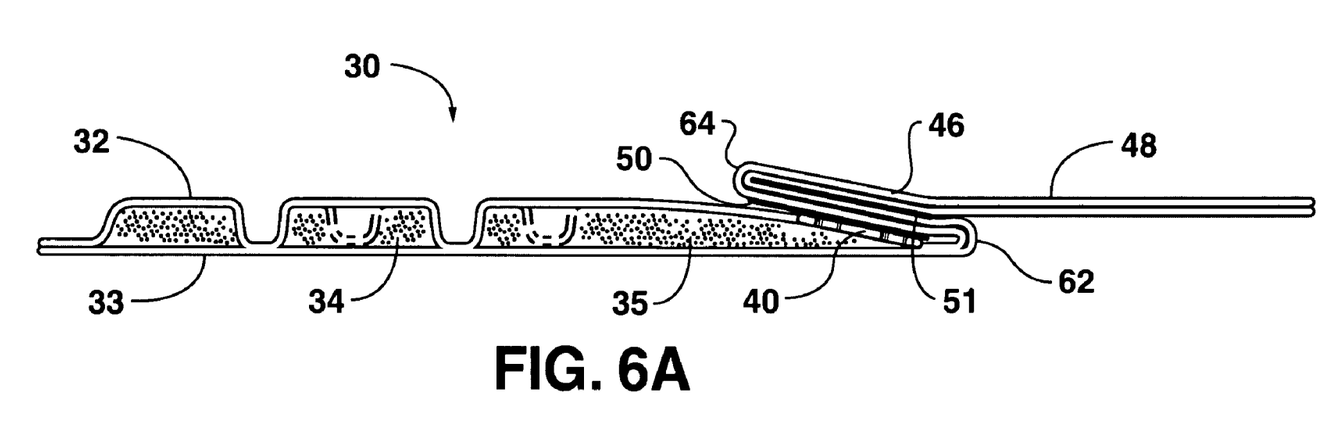
FIGS. 6A and 6B are cut-away views of a pouch configuration in a folded and opened state.
Figure 6B:
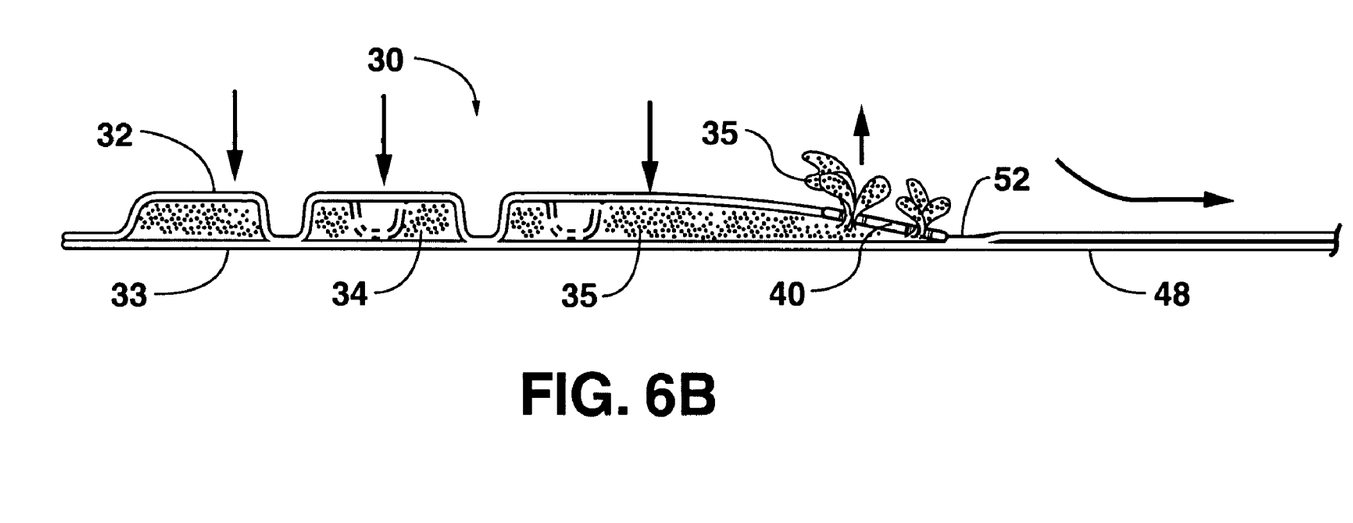

FIGS. 6A and 6B are cross-sectional views illustrating the folded and opened configuration of the pouch 30. This embodiment may be made with the EZ PEEL 34466-G product as the material layers 32, 33 with the frangible sealant layer outwardly facing for each material layer. Referring to FIG. 6A, seal 50 represents the heat seal between the flap 46 and the material layer 32 in a seal zone over the exit structure 40. Seal 51 represents an additional heat seal between folds of the flap 46 that may be desired to maintain the flap 46 in a compact folded state attached to the pouch 30 prior to use of the device 10. FIG. 6B illustrates the flap 46 after flap extension 48 has been pulled by the user along the direction indicated by the arrow. This action causes the flap seal(s) to peel apart and thus expose the exit structure 40, at which point the fluid composition 35 can exit the cavity.

It should be appreciated that the seals 50 and 51 may be provided by an adhesive composition disposed between the mating surfaces, particularly in embodiments wherein non-thermoplastic materials are used as pouch layers 32, 33, or bonding techniques other than heat sealing are used to construct the pouches 30.

Figure 7A:
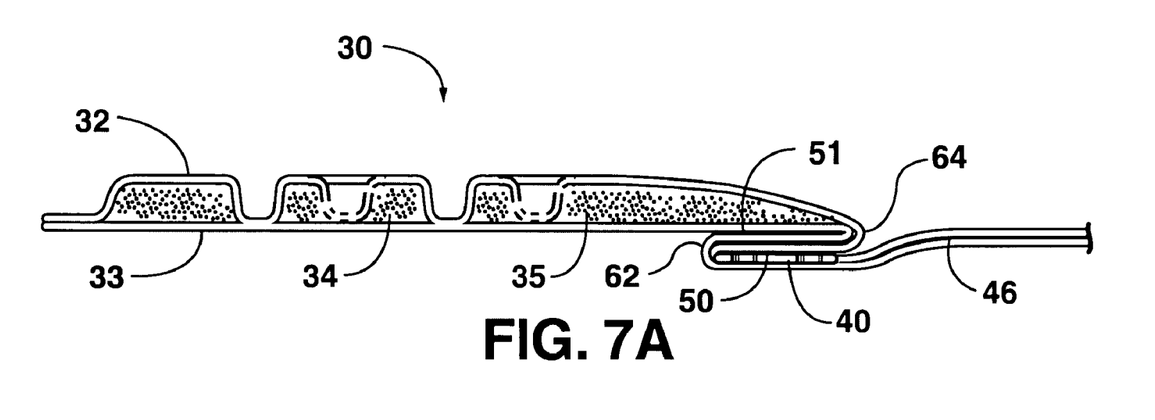
FIGS. 7A and 7B are cut-away views of an alternate pouch configuration in a folded and opened state.
Figure 7B:
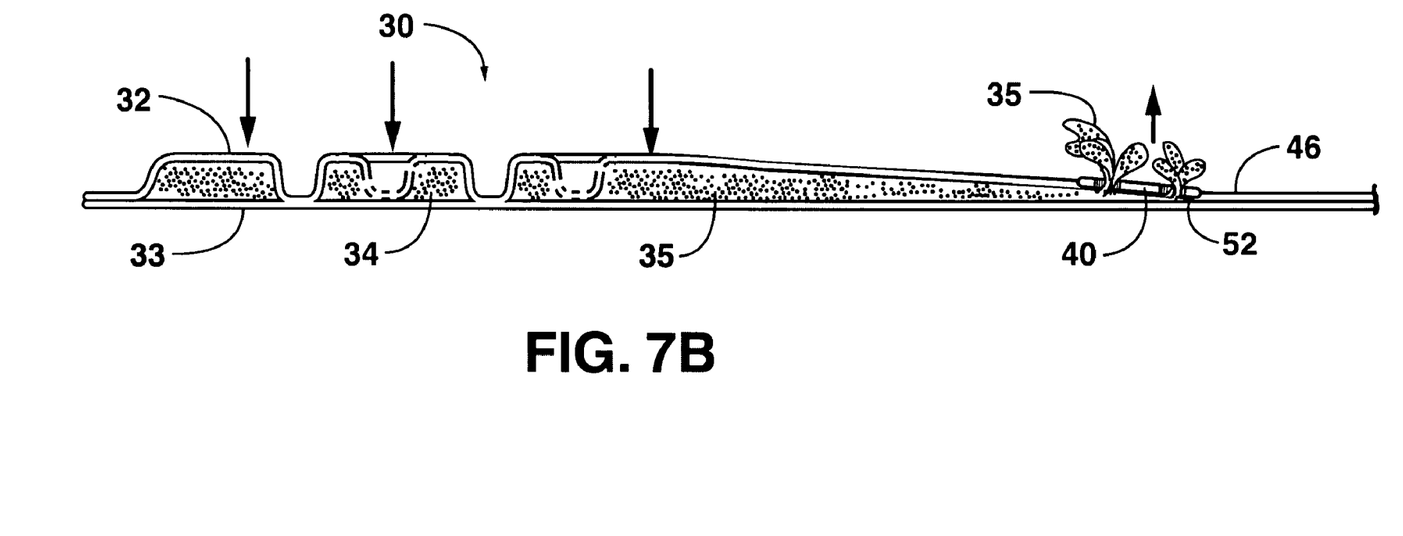

FIGS. 7A and 7B illustrate an embodiment wherein the flap 46 is folded at a second fold line 64 disposed such that the exit structure 40 (with a first fold of flap 46 sealed thereto at seal 50) is folded in an opposite direction so as to lie adjacent to the second material layer 33. This additional fold may be attached to the material layer 33 with a second seal 51. In this configuration, the exit structure 40 is isolated from the contents of the cavity by the second fold line 64. In this embodiment, the opposed material layers 32, 33 may be thermoplastic materials heat-sealed together along a perimeter seal defining the cavity 34. The flap 46 is heat sealed directly to the first material layer 32 over the exit structure 40 (as indicated at seal 50) in a seal zone that circumscribes the exit structure 40. The additional fold of the flap 46 is heat sealed directly to the second material layer 33 adjacent the second fold line, as indicated by seal 51. The first and second material layers 32, 33 may be multi-layer films having an outer surface with a melt point such that the flap heat seals 50, 51 are made at a temperature lower than that needed to heat seal the inner surfaces of the material layers 32, 33 together.

It should be appreciated that any embodiment of a pouch 30 according to the invention may be made from various combinations of single and multi-layer films selected to have desired heat seal characteristics for defining the perimeter seal defining cavity 34, as well as any baffle seal 60 or nozzle seal 56, and the flap seal 50 (and seal 51 if included). With certain combinations of films, care must be taken to prevent the material layers 32, 33 from sealing together and collapsing the cavity 34 when forming the seal 50. In this regard, FIG. 4B illustrates an embodiment wherein material layers 32, 33 may include inner film layers that could seal together at or near the exit structure when forming the flap seal 50. To prevent this situation, an insert material 44 is placed within the cavity 34 prior to sealing the ends of the cavity 34. The insert 44 is positioned so as to underlie the exit structure 40 and extend beyond the seal zone 42. The insert 44 is made of a material that will not seal with at least the upper material layer 32 when the seal 50 is formed between the flap 46 and material layer 32. The insert 44 may be, for example, a flexible piece of poly material having a higher melt point than material layer 32. The insert 44 thus ensures that the cavity 34 is not collapsed and sealed around the exit structure 40 when forming the flap seal 50. The insert 44 may be a multi-layered film such as a polyester/sealant layer film having a surface adjacent material layer 32 that will not heat seal with layer 32, and an opposite surface that will heat seal with material layer 34, and an opposite sealant layer surface that will heat seal with material layer 33 within the cavity, thus ensuring that the insert 44 is held in place during the sealing process. It should be appreciated that any type of material or structure may serve as insert 44.

In the embodiment of FIG. 4B, the flap extension 48 is simply an extension of the entire flap 46.

So as not to pull the pouch 30 within the interior space 22 upon pulling the flap extension 48, it may be desired to attach the pouch 30 to at least one of the wipe layer 18 or back layer 16. Referring to FIG. 3B, this may be accomplished by any manner of adhesive 53. For example, the adhesive 53 may be used to attach the pouch 30 to the back layer 16.

The fluid composition 35 contained within the pouch 30 may be any fluid suitable for the intended use of the applicator 10, including cleansing fluids for human/animal use and cleaning fluids for cleaning surfaces. The fluid may be any paste, gel, powder, oil, liquid, or any other appropriate medium. Example cleansing fluids include surfactants such as water-soluble polymers, polysorbates, glycerins, glycol-based surfactants, and/or silicone-based surfactants. The fluid may include other materials, such as water, salts, vinegars, humectants, scouring powders, thickening agents, and fragrances. A cleansing fluid may also include a moisturizer that helps to maintain a normal skin hydration level. A cleansing fluid may also include preservatives and other ingredients that do not disrupt the normal flora of the vaginal area (e.g., sorbic acid, citric acid, methyl paraben, and natural preservatives such as grapefruit extract). The fluid may include other materials that may be applied to an area of the body. Example materials include lubricants, deodorants, and other inactive or active ingredients (e.g., spermicidal agent or medication). In one aspect of the present invention, the fluid is a cleansing fluid that is primarily a water-based solution (90%+water content) with a surfactant, preservatives, pH neutralizers, and a thickening agent.

The fluid may be a cleaning solution such as FOUR PAWS Super Strength Stain and Odor Remover, which includes water, natural enzymes, and mild detergent (from Four Paws Products, Ltd., Hauppauge, N.Y.), or NATURE'S MIRACLE Stain & Odor Remover, which includes water, natural enzymes, isopropyl alcohol, and natural citrus scent (from Pets 'N People, Inc., Rolling Hills Estates, Calif.), or RESOLVE Carpet Spot & Stain Carpet Cleaner (from Reckitt Benckiser, Wayne, N.J.). The fluid may be a pet shampoo. The fluid may be a stain cleaner and stain guard such as SCOTCH-GARD Oxy Carpet Cleaner with Stain Protector that includes water, 2-butoxyethanol, hydrogen peroxide, and surfactants (from 3M Corporation, St. Paul, Minn.). In the case of using the cleaning device 10 to clean a fabric surface, the fluid may include a pet repellant such as SIMPLE SOLUTION Indoor/Outdoor Repellent for Dogs and Cats, which has as an active ingredient methyl nonyl ketone (from The Bramton Company, Dallas, Tex.).

The fluid may be an antimicrobial. Examples of suitable antimicrobials include quaternary ammonium compounds such as 3-trimethoxysilylpropyldimethyloctadecyl ammonium chloride (AEGIS); poly cationic chemicals such as biguanides (poly(hexamethylene)biguanide hydrochloride (PHMB) Arch Chemical), 2,4,4'-Trichloro-2'-hydroxyl-dipenylether (Tinosan, Ciba); diphenyl ether (bis-phenyl) derivatives known as either 2,4,4'-trichloro-2' hydroxy dipenyl ether or 5-chloro-2-(2,4-dichlorophenoxyl)phenol; triclosan; silver; and copper. The fluid may be an allergen sequestrate that may be a charged or mixed charged particle or nanoparticle. Most allergy proteins are glycoproteins (proteins that contain covalently-bound oligosaccharides), so a negative charge may be better then predominance of positive charges on the particles, although mixed charges may be preferred. Clays or modified clays work in this respect. Examples of suitable allergen sequestrates include plant lectins with an affinity for N-acetylgalactosamine such as jacalin, peanut, and soybean, where the lectins both bind allergens and are bound to the web, thus removing allergens from a surface. The fluid may also include a fragrance. The fluid may also include a pheromone to either attract or repel an animal. The fluid may also be shoe polish, a carpet cleaning solution, a stain removal fluid, kitchen floor and counter top cleaners, etc.

Embodiments of the invention have been described with reference to various specific and illustrative aspects and techniques. However, it should be understood that many variations and modifications may be made while remaining within the spirit and scope. Accordingly, this is intended to embrace all such alternatives, modifications and variations that fall within the spirit and scope of the appended claims.

What is claimed is:

1. A fluid applicator device comprising:
   a wipe layer, and a back layer attached to said wipe layer to form an interior space therebetween;
   a pouch disposed within said interior space, said pouch further comprising
      opposed first and second material layers defining a sealed cavity between said opposed layers, and a fluid composition contained within said cavity;
      exit structure defined in said first material layer through which said composition exits said cavity;
      a flap defined by a portion of said opposed layers folded at a first fold line so as to extend over and releasably seal to said first material layer over said exit structure, said flap having an extension that extends out from between said wipe layer and said back layer a sufficient distance so as to be grasped by a user; and
   wherein said flap extension is pulled by a user prior to use of said applicator device causing said flap to be peeled back and unsealed from said exit structure such that said fluid composition is pressed out of said pouch with use of said device.

2. The applicator device as in claim 1, wherein said back layer is fluid impermeable and said wipe layer is fluid permeable such that said fluid composition migrates through only said wipe layer with use of said device.

3. The applicator device as in claim 1, further comprising an additional layer disposed so as to define a mitt structure for accommodating a user's hand or fingers between said back layer and said additional layer.

4. The applicator device as in claim 3, wherein said additional layer and said wipe layer are extensions of a common piece of folded material, said back layer comprising an intermediate fluid impermeable material layer.

5. The applicator device as in claim 1, wherein said pouch is attached to at least one of said wipe layer or said back layer.

6. The applicator device as in claim 1, wherein said back layer and said wipe layer are attached along a perimeter seam except for an opening through which said flap extends.

7. The applicator device as in claim 1, wherein said opening is disposed at a longitudinal end of said device.

8. The applicator device as in claim 1, wherein said wipe layer comprises a textured outer face.

9. The applicator device as in claim 1, wherein said opposed material layers are sealed together along a perimeter seal defining said cavity.

10. The applicator device as in claim 9, wherein said opposed material layers comprise thermoplastic materials heat sealed together along said perimeter seal, said flap heat sealed directly to said first material layer over said exit structure in a seal zone that circumscribes said exit structure.

11. The applicator device as in claim 10, wherein said first material layer comprises an outer surface with heat seal characteristics such that said flap heat seals against said first material layer with a frangible seal as compared to said perimeter seal.

12. The applicator device as in claim 11, wherein said first material layer comprises a multi-layered film having an outer layer with heat seal characteristics different than an inner layer, said inner layer defining a wall of said cavity.

13. The applicator device as in claim 1, wherein said flap is folded at a second fold line so as to extend back over said exit structure in a second pass before extending out from between said wipe layer and said back layer.

14. The applicator device as in claim 13, wherein said flap is releasably sealed to said second material layer adjacent said second fold line.

15. The applicator device as in claim 1, wherein said flap is folded at a second fold line disposed such that said exit structure is folded adjacent said second material layer and is isolated from said cavity by said second fold line.

16. The applicator device as in claim 15, wherein said flap is releasably sealed to said second material layer adjacent said second fold line.

17. The applicator device as in claim 16, wherein said opposed material layers comprise thermoplastic materials heat sealed together along a perimeter seal defining said cavity, said flap heat sealed directly to said first material layer over said exit structure in a seal zone that circumscribes said exit structure, and said flap heat sealed directly to said second material layer adjacent said second fold line.

18. The applicator device as in claim 17, wherein said first and second material layers comprise an outer surface with a heat seal characteristics such that said flap heat seals against said first and second material layers in a frangible seal as compared to said heat seal between said first and second material layers together along said perimeter seal.

19. The applicator device as in claim 18, wherein said first and second material layers comprise multi-layered films having an outer layer with heat seal characteristics different than an inner layer, said inner layers defining walls of said cavity.

20. The applicator device as in claim 1, wherein said first and second opposed material layers comprise thermoplastic materials heat sealed together along a perimeter seal defining said cavity, said flap heat sealed directly to said first material layer over said exit structure in a seal zone that circumscribes said exit structure, and further comprising an insert within said cavity disposed to prevent said first and second material layers from sealing together upon heat sealing said flap to said first material layer.

21. The applicator device as in claim 1, wherein said device is configured as a cleaning device and said fluid composition comprises a cleaning agent.

22. The applicator device as in claim 1, further comprising baffles within said pouch cavity.

23. The applicator device as in claim 22, wherein said baffles comprise seal lines between said opposed first and second material layers of said pouch.

24. The applicator device as in claim 1, wherein said device is a mitt structure configured to accommodate a user's hand or fingers between said wipe layer and an additional layer, said back layer comprising a fluid impermeable layer disposed within said mitt structure adjacent the user's hand or fingers.

25. The applicator device as in claim 24, wherein said additional layer and said wipe layer are extensions of a common piece of folded material.

26. The applicator device as in claim 1, wherein said flap is attached to said first material layer over said exit structure with a releasable adhesive.

27. The applicator device as in claim 26, wherein said first material layer comprises an adhesive coating on an outer surface thereof.

28. The applicator device as in claim 27, wherein said adhesive coating is heat activated.

* * * * *

UNITED STATES PATENT AND TRADEMARK OFFICE
CERTIFICATE OF CORRECTION

PATENT NO. : 7,575,384 B2 Page 1 of 1
APPLICATION NO. : 11/217079
DATED : August 18, 2009
INVENTOR(S) : Bauer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 926 days.

Signed and Sealed this

Seventh Day of September, 2010

David J. Kappos
*Director of the United States Patent and Trademark Office*